Jan. 11, 1944.  J. C. FORTUNE  2,338,759
CHOKE VALVE
Filed May 14, 1942   2 Sheets-Sheet 1
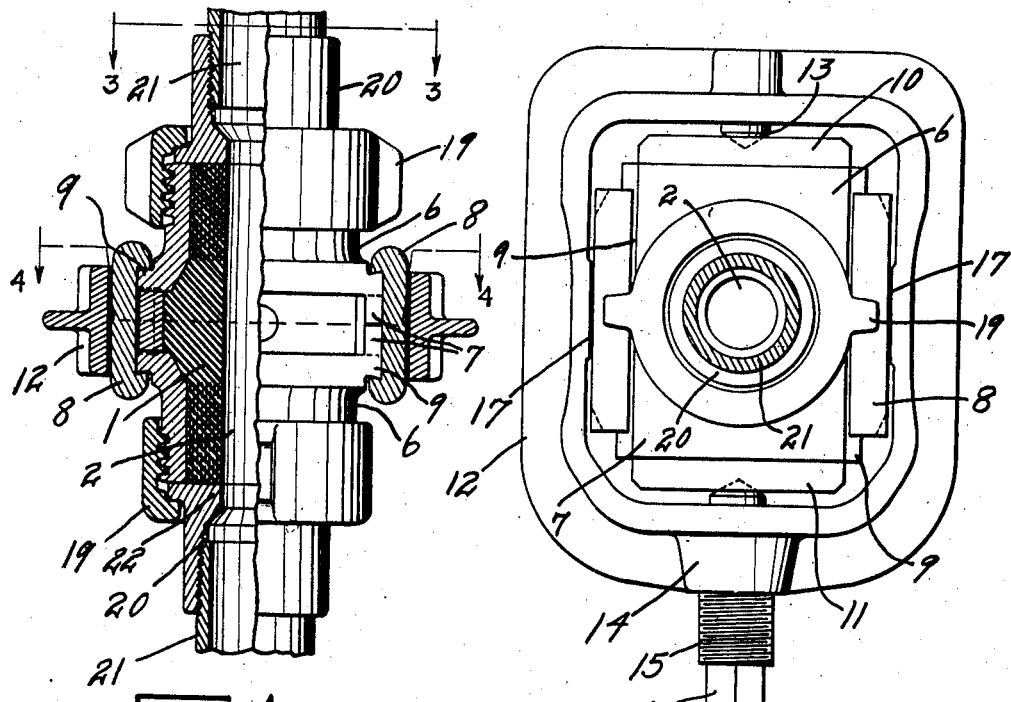
Fig. 1.
Fig. 3.
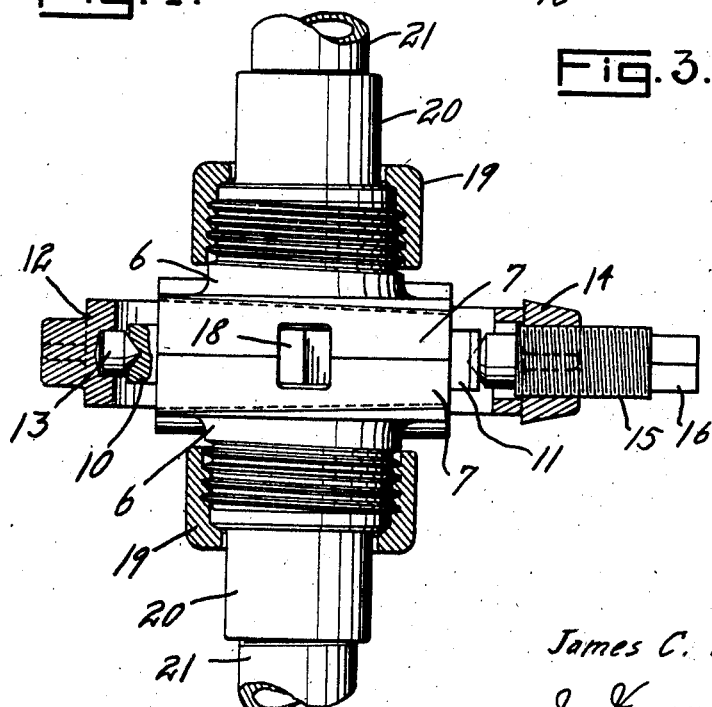
Fig. 2.
James C. Fortune.
INVENTOR.
BY
ATTORNEYS Jan. 11, 1944. J. C. FORTUNE 2,338,759
CHOKE VALVE
Filed May 14, 1942 2 Sheets-Sheet 2

James C. Fortune
INVENTOR.
BY
ATTORNEYS

Patented Jan. 11, 1944

2,338,759

UNITED STATES PATENT OFFICE 2,338,759

CHOKE VALVE

James C. Fortune, Houston, Tex., assignor to Reed Roller Bit Company, Houston, Tex., a corporation of Texas Application May 14, 1942, Serial No. 442,944

6 Claims. (Cl. 251—5)

This invention relates in general to throttle valves and more particularly has reference to throttle valves for use with high pressure fluids containing abrasives.

Throttle valves of various types are extensively used in many industries for controlling the flow of many types of fluids. Fluids containing abrasives are particularly difficult to control due to the wearing action of the abrasives on the parts of the valve and in spite of the many valves developed, few if any have solved the problem for which they were contemplated.

It is an object of this invention to provide a throttling valve that may be closed against extremely high pressures when abrasive fluid is flowing through it.

Another object of this invention is to provide a valve of this type in which the wearing part is easily and cheaply replaced.

A further object of this invention is to provide a valve that will throttle an abrasive fluid for a much longer time than the present throttling valves.

Still another object of this invention is to provide an adjustable flow bean.

A still further object of this invention is to provide an adjustable fluid flow control device comprising a body of resilient plastic material having a flow bore therethrough, and means for compressing the body in directions radially of the bore to reduce the diameter of the bore in substantially all directions radially of the bore.

Further objects of the invention will readily appear from the description hereinafter set forth and the accompanying drawings.

Figure 4:
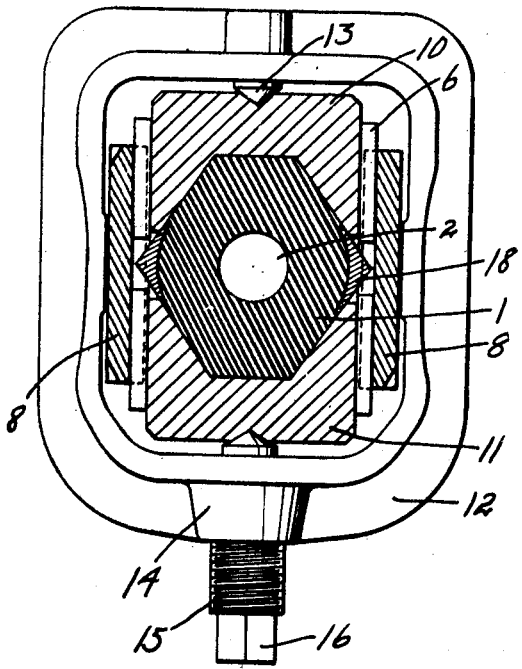
Figure 5:
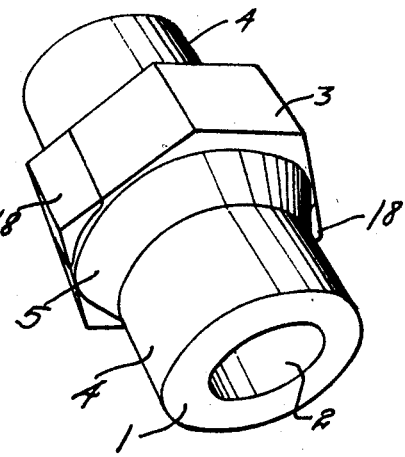
Figure 6:
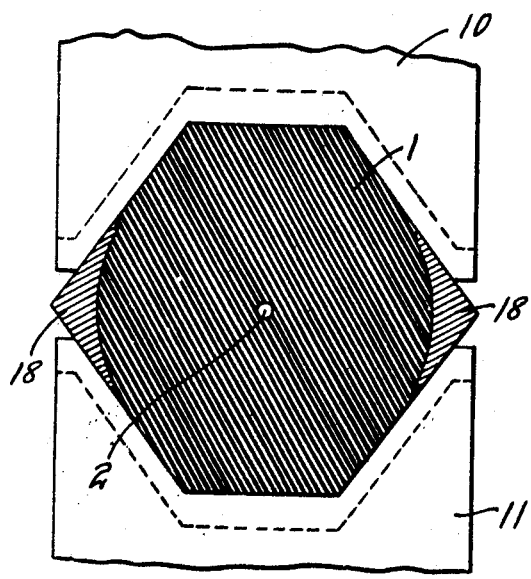
Figure 7:
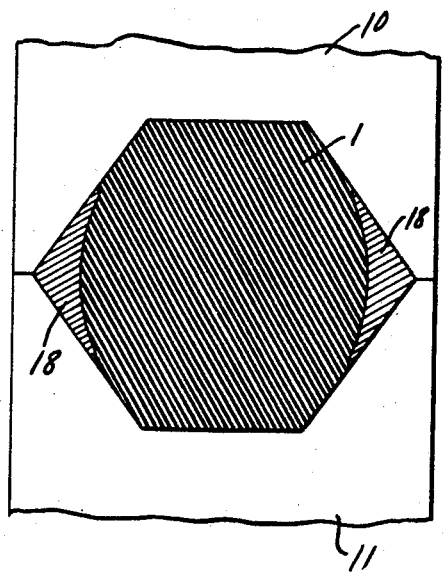

In order to more clearly illustrate the invention reference is made to the accompanying drawings in which:

Fig. 1 is an elevational view partly in section of a valve constructed in accordance with the present invention, Fig. 2 is a partial sectional view of the valve taken at an angle of 90° relative to the view shown in Fig. 1, Fig. 3 is a sectional view taken on line 3—3 of Fig. 1, Fig. 4 is a sectional view taken on line 4—4 of Fig. 1, Fig. 5 is a perspective view of the resilient body which is compressed to control the flow of fluid therethrough, Fig. 6 is a fragmentary transverse sectional view similar to Fig. 4 showing the resilient body partly compressed to reduce the cross section of the opening therein, and Fig. 7 is a similar view in which the opening through the resilient body is completely closed.

As illustrated in the drawings, the present invention comprises a body 1 of rubber or other resilient plastic material having a bore 2 extending axially therethrough. Intermediate its ends the body 1 is of enlarged cross-section as designated by reference character 3 and is of hexagonal configuration. On each side of the enlargement 3 the body is of cylindrical formation as indicated by reference characters 4. The portions 4 are joined to the enlarged hexagonal portion 3 by tapered portions 5.

It is advantageous that the cylindrical portions 4 be reinforced by incorporating fabric, cord or other suitable means therein to form a laminated or similar construction (see Fig. 1) which reduces both the resiliency and plasticity of the material in these portions.

A body constructed as described may be compressed intermediate its ends in the region of the enlarged portion 3 to reduce the diameter of the bore 2 in this region. Any axial elongation will due to the reinforced construction of the portions 4 be transmitted through portions 4 to provide a tighter seal between the portions 4 and the flanges 22, while the bores through the portions 4 will not be substantially reduced.

Body 1 is positioned in a casing formed of two similar tubular members 6; each of said members 6 is of a length slightly shorter than that of the body 1 from the enlarged portion 3 thereof to one end face thereof and is internally shaped to snugly receive the portions 4 and 5 of body 1 as is clear from an inspection of Fig. 1.

The inner ends 7 of the members 6 are of rectangular shape and are butted together as shown in Fig. 2, and retained in assembled relation by means of clamps 8 which are slid onto the wedge-like seats 9. The seats 9 are of dovetail formation and the clamps 8 are of similar formation so that when the clamps are driven onto the seats there will be no danger of the clamps laterally sliding off of the seats.

The inner ends 7 of the members 6 are provided with cooperating channels in their abutting faces extending from one side edge thereof to the opposite side edge thereof to expose the enlarged portion 3 of the body 1 and form gateways for a pair of gates 10 and 11.

With this construction it will be realized that by displacing the gates toward each other they will come into engagement with the enlarged portion 3 of the body 1 and upon further displacement of the gates the body 1 will be compressed. To effect movement of the gates 10 and 11 I have provided a yoke 12 which completely surrounds the valve structure in the region of the gates. Adjacent the outer end of one gate there is provided a fixed pin 13 having a conical bearing surface which is adapted to engage in a conical recess formed in the outer end of gate 10. On its opposite side, yoke 12 is provided with a boss 14 which is bored and threaded to receive a threaded screw 15. Screw 15 is provided with a conical pointed end adapted to engage in a conical recess formed in the outer end face of gate 11. The outer end of screw 15 is shaped as indicated by reference character 16 to receive a wrench or hand operating means for rotating the same and adjusting the distance between the pointed end of pin 13 and the pointed end of said screw. The other two sides of the yoke are provided with lugs 17 adapted to engage the clamps 8 and maintain the yoke in proper position on the assembly.

It will be realized that while the yoke is maintained in positioned by engagement with the clamps nevertheless upon tightening of the screw 15 the two gates 10 and 11 will be drawn toward each other and the yoke 12 will have a tendency to slide along the surfaces of the clamps 8 so as to effect a substantially equal displacement of the gates 10 and 11.

In the form of invention shown in the drawings the enlarged portion 3 of the resilient body 1 is of substantially hexagonal configuration and the inner faces of the gates which are adapted to engage the enlarged portion 3 of the body 1 are provided with semi-hexagonal shaped recesses or notches. With this construction as the gates are forced toward each other, the enlarged portion 3 of the resilient body 1 is compressed and if no means were provided to prevent lateral expansion of the resilient body from between the gates 10 and 11 it would be difficult to obtain effective operation of the valve under all conditions. To avoid this difficulty however, one pair of opposite angular parts of the enlarged portion 3 of the body 1 are formed of a hard material. These parts indicated by reference character 18 may be formed of metal or other suitable material vulcanized or otherwise attached to the enlarged portion 3 and forming a part thereof.

As shown in Figs. 2 and 4 the side edges of the ends 7 of the tubular member 6 are cut away to provide openings to accommodate the corner parts 18 of the enlarged portion 3. The angular inserts 18 of hardened material are of sufficient extent along the adjacent faces of the hexagonal enlarged portion 3 so that they will be in contact with the angular disposed faces of the notches or recesses formed in the inner ends of the gates 10 and 11 when said gates are sufficiently spaced apart to exert practically no compressive effect on the body 1. With this construction, as the gates 10 and 11 are moved toward each other, the enlarged portion 3 of the resilient body will not only be compressed in a direction parallel to the displacement of the gates but due to the angular walls of the notches or recesses in the ends of the gates there will be compressive components exerted in a plurality of other directions radially of the body 1. Furthermore, due to the provision of the parts 18 of hardened material the displacement of the gates 10 and 11 toward each other will cause said parts 18 of hardened material to be displaced toward each other to exert a further compression of the body in a direction transversely of the direction of movement of the gates. Thus it will be appreciated that the enlarged portion 3 of the resilient body 1 will be compressed in a plurality of directions radially of bore 2. When the gates 10 and 11 and the hardened parts 18 of the body 1 are in the positions shown in Fig. 6 of the drawings the body 1 will be sufficiently compressed to reduce the cross-section of the opening or bore 2 as indicated. Further displacement of the gates 10 and 11 toward each other will eventually close the opening 2 so that said opening will completely disappear as is indicated in Fig. 7 of the drawings. In this instance the enlarged portion 3 of the resilient body 1 including the hard parts 18 will be completely surrounded by the recesses provided in the opposite faces of the gates 10 and 11.

When considerable pressure is exerted on the body 1 radially thereof by the displacement of the gates 10 and 11 toward each other, there will be a tendency to extrude the resilient body 1 axially from the outer ends of the tubular member 6. To avoid this the portions 4 of the body 1 are reinforced as hereinbefore described. The reinforcement may include fabric laminations incorporated in the resilient material. To further prevent extrustion of the resilient body from the member 6 the outer ends of said members 6 are externally threaded to receive coupling nuts 19 which serve to retain fittings 20 against the outer end faces of the member 6. The fittings 20 at their outer extremity are threaded to receive conduits 21 for supplying fluid to and discharging fluid from the valve. Fittings 20 are provided at their inner ends with an opening of substantially the same size of the maximum diameter of the bore 2 in the resilient body 1 when non-compressed. This provides a shoulder or ledge 22 which engages the outer end faces of the resilient body 1 and positively blocks extrusion of said body from the ends of the member 6.

With the construction above described the resilient body 1 may be compressed intermediate its ends by displacement of the gates 10 and 11 toward each other and the compression will be utilized substantially to reduce the cross-sectional area of the bore 2 through the resilient body 1 in the region of compression. Since the fluid flow through the bore 2 will not contact any metallic moving parts there is no danger of wearing of said parts nor particles of grit preventing the proper operation of the parts.

While the enlarged portion 3 of the resilient body 1 has been shown to be of hexagonal formation, it should be obvious that the portion may be square or of other configuration which will properly cooperate with notches in the ends of the gates to effect a compression of the resilient body in a plurality of directions radially thereof to effectively reduce the cross-section of the bore 2.

Having described my invention, I claim:

1. An adjustable fluid flow control device comprising a body of resilient plastic material having a flow bore therethrough, means for compressing the body in directions radially of the bore to reduce the diameter of the bore in substantially all directions radially of the bore, and means forming an integral part of the body for reinforcing the body adjacent the compressed portion to resist axial expansion thereof during compression.

2. An adjustable fluid flow control device comprising a body of resilient plastic material having a flow bore therethrough, rigid armor means surrounding and closely embracing the body including the ends thereof and having flow ports aligned with the flow bore in the body, and means intermediate the ends of the body for compressing the body in directions radially of the bore to reduce the diameter of the bore in substantially all directions radially of the bore.

3. An adjustable fluid flow control device comprising a body of resilient plastic material having a flow bore therethrough, armor means surrounding the body including the ends thereof and having flow ports aligned with the flow bore in the body, means intermediate the ends of the body for compressing the body in directions radially of the bore to reduce the diameter of the bore in substantially all directions radially of the bore, and means incorporated into and reinforcing the ends of the body to resist axial extrusion of the body through the ports of the armor.

4. An adjustable fluid flow control device comprising a body of resilient plastic material having a flow bore therethrough, and means for compressing the body in directions radially of the bore to reduce the diameter of the bore in substantially all directions radially of the bore, said compressing means comprising a pair of jaws relatively movable toward each other and provided with cooperating opposed notch-like recesses with substantially flat sides to receive the body of plastic material.

5. An adjustable fluid flow control device comprising a body of resilient plastic material having a flow bore therethrough, means for compressing the body in directions radially of the bore to reduce the diameter of the bore in substantially all directions radially of the bore, said compressing means comprising a pair of jaws relatively movable toward each other and provided with cooperating opposed notch-like recesses to receive the body of plastic material, and means countersunk into said body and cooperating with the jaws to resist extrusion of the body from between the jaws upon relative movement of the jaws together.

6. An adjustable fluid flow control device comprising a body of resilient plastic material having a flow bore therethrough, means for compressing the body in directions radially of the bore to reduce the diameter of the bore in substantially all directions radially of the bore, said compressing means comprising a pair of jaws relatively movable toward each other and provided with cooperating opposed notch-like recesses with substantially flat sides inclined away from each other to receive the body of plastic material, and means cooperating with said flat sides of the jaws to resist extrusion of the body from between the jaws and displaceable laterally toward each other by the action of said inclined flat sides upon relative movement of the jaws together to compress the body in a direction transversely of the direction of relative movement of the jaws.

JAMES C. FORTUNE.